(12) United States Patent
Fassiotto et al.

(10) Patent No.: US 9,460,427 B2
(45) Date of Patent: Oct. 4, 2016

(54) DEVICE, SYSTEM AND METHOD FOR MAKING COMMERCIAL TRANSACTIONS THROUGH A PAPER DOCUMENT

(75) Inventors: Marco Fassiotto, Aosta (IT); Mirko Zanotel, Turin (IT)

(73) Assignee: Panini S.P.A., Torino (TO) (IT)

( * ) Notice: Subject to any disclaimer, the term of this patent is extended or adjusted under 35 U.S.C. 154(b) by 817 days.

(21) Appl. No.: 13/488,927

(22) Filed: Jun. 5, 2012

(65) Prior Publication Data

US 2013/0322731 A1 Dec. 5, 2013

(51) Int. Cl.
*G06Q 20/04* (2012.01)
*G06Q 30/00* (2012.01)

(52) U.S. Cl.
CPC .......... *G06Q 20/0425* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 6,429,952 B1 | 8/2002 | Olbricht | |
| 6,672,623 B2 * | 1/2004 | Patton | G09F 3/00 229/68.1 |
| 2004/0083119 A1 | 4/2004 | Schunder et al. | |
| 2005/0021466 A1 * | 1/2005 | Buchanan | G06Q 20/042 705/42 |
| 2005/0171899 A1 * | 8/2005 | Dunn | G06Q 20/02 705/39 |
| 2006/0064744 A1 | 3/2006 | Jung et al. | |
| 2006/0242062 A1 * | 10/2006 | Peterson | G06Q 20/04 705/42 |
| 2007/0024900 A1 | 2/2007 | Lee | |
| 2010/0318461 A1 * | 12/2010 | Smith | G06Q 20/042 705/43 |
| 2012/0184209 A1 * | 7/2012 | Wengrovitz | H04W 4/02 455/41.2 |

FOREIGN PATENT DOCUMENTS

| | | |
|---|---|---|
| EP | 0 991 227 A2 | 4/2000 |
| GB | 2 415 519 A | 12/2005 |
| JP | 2000-293332 | 10/2000 |
| WO | 2007/091057 A1 | 8/2007 |

OTHER PUBLICATIONS

International Preliminary Report on Patentability dated Dec. 9, 2014, issued in PCT Application No. PCT/IB2013/054579, filed Jun. 4, 2013.
Written Opinion dated Sep. 19, 2012, issued in Italian Application No. TO2012A000489 filed Jun. 5, 2012 in the name of Panini S.P.A.
Communication pursuant to Article 94(3) EPC dated May 11, 2016, issued in EP Application No. 13739799.8, filed Apr. 8, 2015.

* cited by examiner

*Primary Examiner* — Siamak Harandi
(74) *Attorney, Agent, or Firm* — Workman Nydegger

(57) ABSTRACT

A system for making commercial transactions through a paper document includes: a device (3) for reading and scanning the paper document containing information useful for a commercial transaction, the reading and scanning device (3) having an IP address; a user device (5); an interface (7), in particular a connection, between the reading and scanning device (3) and the user device (5), wherein the reading and scanning device (3) includes a software interface adapted to exchange data and/or the information with the user device (5) through the interface (7) and via the HTTP protocol.

21 Claims, 5 Drawing Sheets

| Parameter name | Serial parameter ID | Values | Description |
|---|---|---|---|
| TIMEOUT | 0 | 0 / 300 | Feeding timeout (seconds) |
| EN_MICR | 1 | 0 | Disable |
|  |  | 1 | Enable |
| MICR_TYPE | 2 | 0 | CMC7 |
|  |  | 1 | E13B |
|  |  | 2 | AUTO |
| EN_FRONT_1 | 3 | 0 | Disable |
|  |  | 1 | Enable |
| FRONT_FORMAT_1 | 4 | 0 | GIV |
|  |  | 1 | JPEG |
|  |  | 2 | BMP |
| FRONT_DPI_1 | 5 | 100 | 100 DPI |
|  |  | 200 | 200 DPI |
| EN_REAR_1 | 6 | 0 | Disable |
|  |  | 1 | Enable |
| REAR_FORMAT_1 | 7 | 0 | GIV |
|  |  | 1 | JPEG |
|  |  | 2 | BMP |
| REAR_DPI_1 | 8 | 100 | 100 DPI |
|  |  | 200 | 200 DPI |

Fig. 3

DEVICE, SYSTEM AND METHOD FOR MAKING COMMERCIAL TRANSACTIONS THROUGH A PAPER DOCUMENT

BACKGROUND OF THE INVENTION

1. Field of the Invention

The present invention relates to a device, a system and a method for making commercial transactions.

More in particular, the present invention relates to a device, a system and a method for making commercial transactions through a paper document, which involve scanning an image of a document, e.g. a cheque, reading a magnetic codeline, e.g. a MICR ("Magnetic Ink Character Recognition") code, and making prints or endorsements on the treated document or cheque.

2. Present State of the Art

Nowadays, payments are increasingly made through electronic transactions. Shops, supermarkets, gas stations, medical consulting rooms, and offices of various kinds have POS terminals that accept credit cards, which allow people to pay for purchased goods and services. Those users who have an "Internet banking" platform available can also make payments, bank transfers and other banking operations through a personal computer (PC), a mobile telephone, a smartphone and other similar user devices.

In addition to the above-mentioned electronic transactions, there are also electronic transactions of a different type which are related to paper documents, such as cheques, luncheon vouchers, invoices and, in general, paper documents of any kind containing information adapted to generate a commercial transaction.

Devices are known, e.g. the "I:Deal" and "wI:Deal" products marketed by the present Applicant, which can automatically read essential information contained in a document, such as, for example, the front and back images and the MICR code of a cheque.

The operation of such devices can be summarized as follows:

a) turning on the device and making it ready to accept commands;
b) possibly changing its default behaviour;
c) indicating to the device that it must get ready to accept documents;
d) providing the device with a document to be scanned;
e) taking data from the document (e.g. image and MICR code);
f) either returning to step d) for another document or ending the procedure.

These devices require a specific configuration and a physical connection to a computer associated therewith for driving the device and then treating the document data; therefore, they are essentially only used at banks, small companies, professional firms, offices and cash-desks.

Payment systems are also known in the art which involve personal devices which are often owned by the user, such as smartphones, tablets and mobile telephones. However, such payment systems are used for purely electronic commercial transactions, not for commercial transactions involving the use of paper documents, in which case they could with difficulty capture the image, but could not read and decode the MICR codeline that represents one of the very few real security features of a cheque.

Moreover, such devices belonging to a user are of heterogeneous types and support different operating systems and hardware configurations, so that it is unthinkable to create a single software application that embraces all these devices and allows making economical transactions through paper documents.

SUMMARY OF THE INVENTION

It is therefore one object of the present invention to provide a device, a system and a method for making commercial transactions through a paper document by means of a user device, in particular a POS terminal, a computer, a mobile telephone, a smartphone or a tablet.

It is a further object of the present invention to provide a device, a system and a method for making commercial transactions through a paper document in real time.

It is a further object of the present invention to provide a method for making commercial transactions through a paper document which can be carried out by innumerable users.

It is yet another object of the present invention to provide a method for making commercial transactions through a paper document which can be carried out in mobility.

These and other objects of the invention are achieved through a device, a system and a method for making commercial transactions through a paper document as claimed in the appended claims, which are intended to be an integral part of the present description.

In short, the invention springs from the need of controlling a reading and scanning device for making commercial transactions through a paper document by means of a user device (POS terminal, smartphone, mobile telephone, computer, laptop) without having to install special software applications nor any APIs ("Application Program Interface") or libraries in said user devices, or without having to modify the hardware thereof.

According to the invention, the reading and scanning device for making commercial transactions through a paper document receives commands from a user device through the HTTP protocol. By means of three commands only, i.e. POST, GET and SET, the user device can control and exchange data with a software interface of the device for making commercial transactions through a paper document.

The use of the HTTP protocol is advantageous because it is largely independent of the operating system, it is a standard, includes all commands necessary for reading from and writing to a device, and has been conceived for operating in wired or wireless environments. In addition, the HTTP protocol can be implemented on a large number of physical connections, such as wired connections in a LAN network, wired connections using the USB protocol, wireless connections in a WiFi network and wireless connections using the Bluetooth protocol.

In order to drive the device for reading and scanning a paper document, it is therefore sufficient that the user device includes a web browser pointing to an IP address of the reading and scanning device, so that control and data packets can be sent to and received from the latter.

Further features of the invention are set out in the appended claims, which are intended to be an integral part of the present description.

BRIEF DESCRIPTION OF THE DRAWINGS

The above objects will become more apparent from the following detailed description of a device, a system and a method for making commercial transactions through a paper document, with particular reference to the annexed drawings, wherein:

FIG. 3 shows an example of a parameter table used for configuring the reading and scanning device according to the invention;

DETAILED DESCRIPTION OF THE PREFERRED EMBODIMENTS

Figure 1:
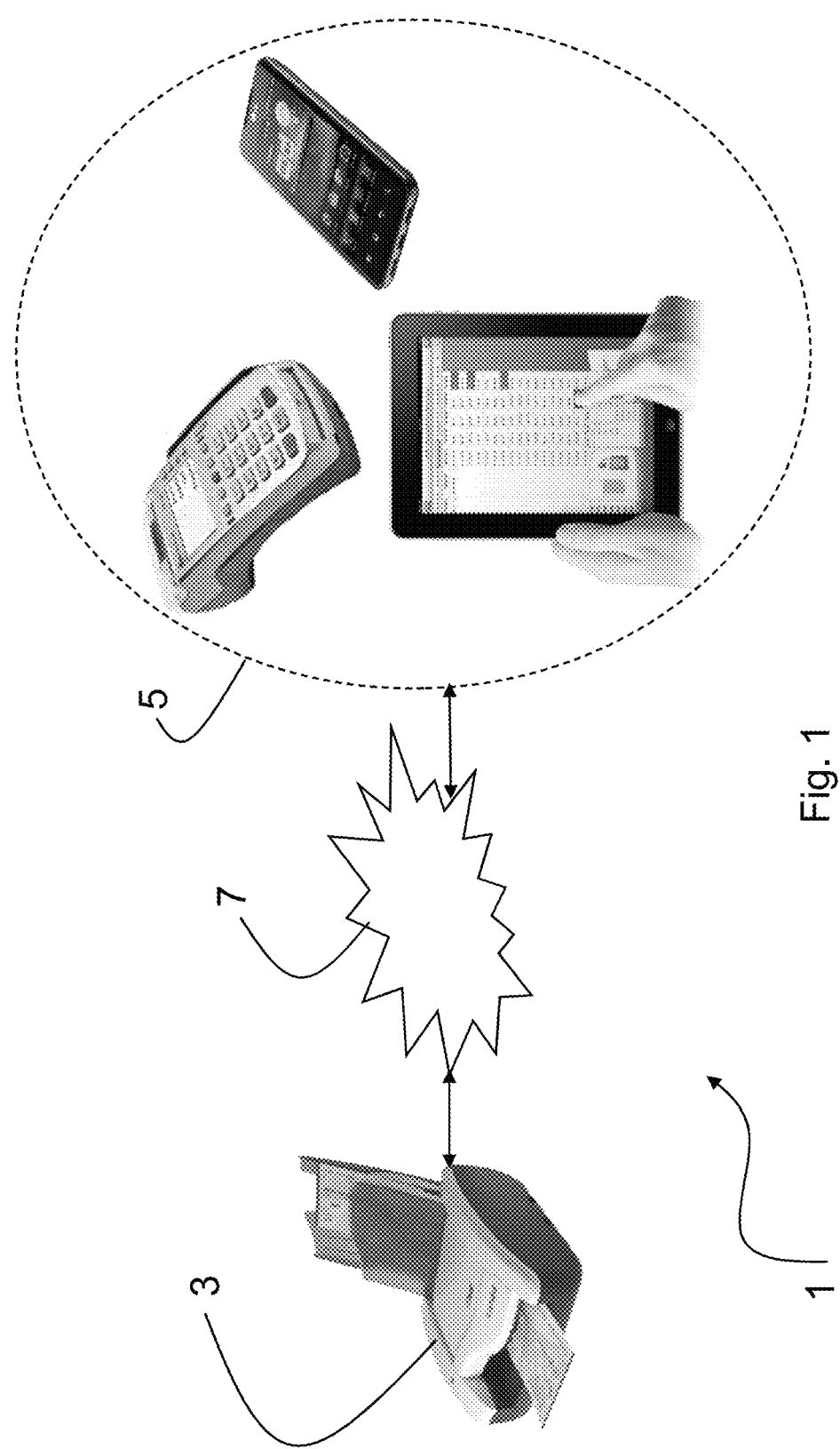
FIG. 1 shows a basic diagram of a system 1 for making commercial transactions through a paper document according to the invention.

With reference to FIG. 1, there is shown a basic diagram of a system 1 for making commercial transactions through a paper document, which comprises: a device 3 for reading and scanning a paper document containing information useful for a commercial transaction; a user device 5; interface means 7, in particular a connection between the reading and scanning device 3 and the user device 5.

The reading and scanning device 3 comprises means for scanning an image of said paper document. It may also comprise means for reading an optical or magnetic code, e.g. the MICR code of a cheque, and may be capable of making prints or endorsements on the paper document by means of stamps or inkjet or thermal printing systems.

In a preferred embodiment, the reading and scanning device 3 is a document and cheque sorter.

The user device 5 may be any device capable of communicating with the reading and scanning device 3, in particular a smartphone, a mobile telephone, a computer, a POS (Point of Sale) terminal, a tablet or the like.

The connection 7 may be physically established, for example, by means of a USB cable or in wireless mode.

Figure 2:
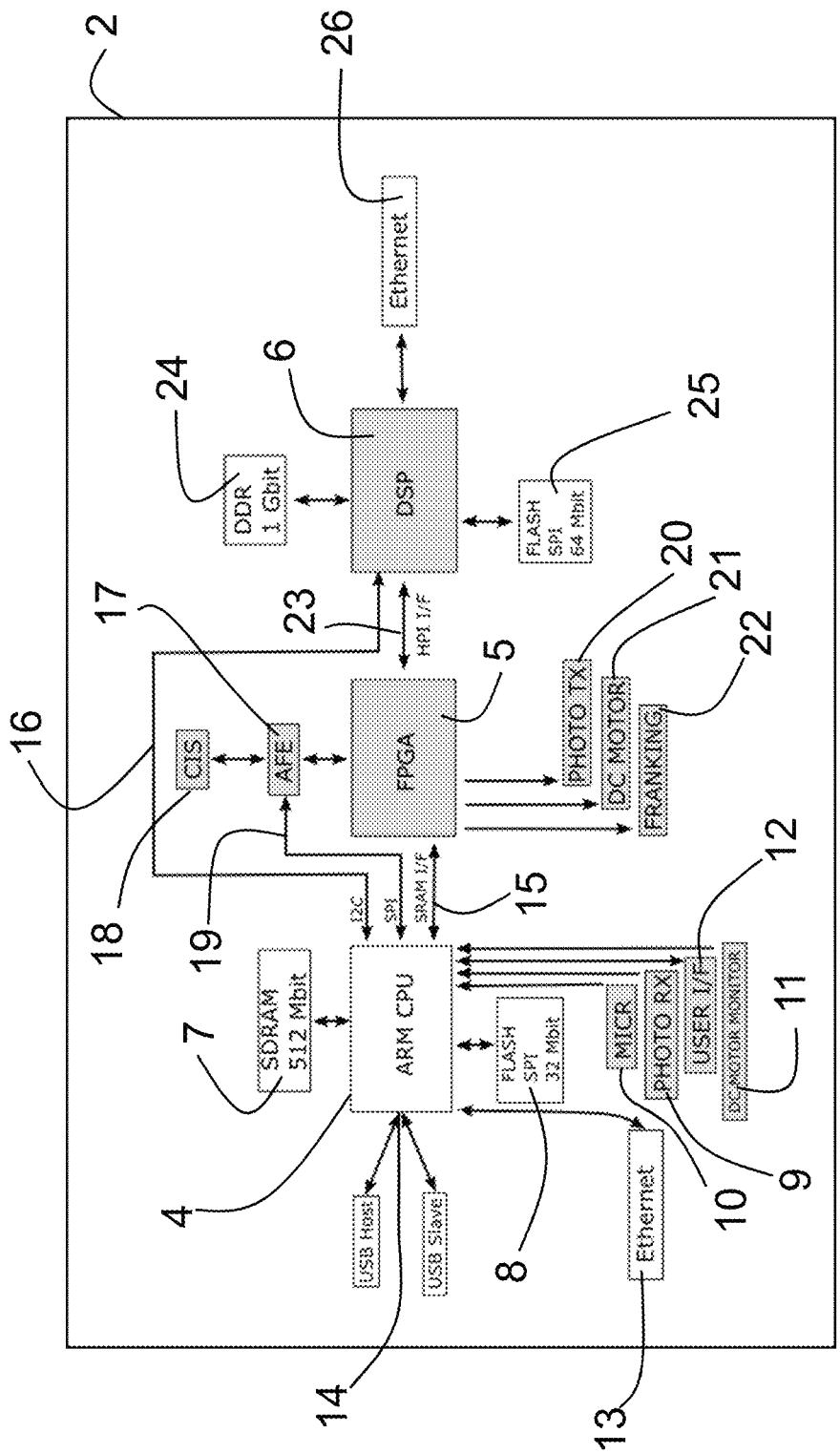
FIG. 2 shows a block diagram of an electronic board installed in a device for reading and scanning a paper document according to the invention.

With reference to FIG. 2, there is shown a block diagram of an electronic board 2 installed in a device 3 for reading and scanning a paper document, which comprises a central processing unit 4, or CPU, a programmable digital integrated circuit 5, in particular an FPGA ("Field Programmable Gate Array") circuit, and a digital signal processor 6, or DSP ("Digital Signal Processor").

The central processing unit 4 is connected to a SDRAM ("Synchronous Dynamic Random Access Memory") memory 7, i.e. a synchronous dynamic RAM memory, e.g. having a capacity of 512 Mbit, and to an SPI ("Serial Peripheral Interface") memory 8, i.e. a flash memory that uses a serial interface.

The central processing unit 4 receives data from means 9 adapted to scan an image and from means 10 adapted to scan an optical or magnetic code, in particular a MICR code, and from a circuit 11 for monitoring a motor used for driving the scanning means 9. It is also in bidirectional communication with a user interface 12.

The central processing unit 4 also comprises a port 13 for establishing a connection to an Ethernet network and a port 14 for a USB connector that allows the reading and scanning device 3 to operate as either master or slave, as will be explained in detail below.

The central processing unit 4 exchanges data with the programmable digital integrated circuit 5 through a SRAM I/F bidirectional connection 15 and with the digital signal processor 6 through an I2C ("Inter Integrated Circuit") bus.

An AFE ("Analog Front End") module 17 receives the scanned analog image from a CIS ("Contact Image Sensor") module 18.

The AFE module 17 is connected to the central processing unit 4 via an SPI ("Serial Peripheral Interface") bidirectional connection 19.

The programmable digital integrated circuit 5 sends commands to the image scanning means 20, to the direct-current motor 21 and to a possible printing or stamping device 22.

The digital signal processor 6 is in bidirectional communication with the programmable digital integrated circuit 5 through a Hardware Platform Interface (HPI) 23.

The digital signal processor 6 is connected to a DDR ("Double Data Rate") memory 24, e.g. having a capacity of 1 Gbit, and to an SPI ("Serial Peripheral Interface") flash memory 25, i.e. a flash memory that uses a serial interface.

The digital signal processor 6 also comprises a port 26 for connecting to an Ethernet network.

The device 3 for reading and scanning a paper document can be addressed through an IP address, preferably a configurable one, by a user device 5, which can then control all functions of the reading and scanning device 3 through the HTTP protocol or the HTTPS protocol.

If the reading and scanning device 3 implements an internal web server and a software interface, and the user device 5 includes a browser or a specific application, then the device 3 can transmit to the user device 5 its own internal Web site, which de facto reproduces on the browser of the user device 5 a sequence of Web pages that allow starting a scan, configuring the paper document capture parameters, receiving and displaying on the display of the user device 5 the scanned images of the paper document and possibly the MICR code.

The user device 5 can thus command the following operations:

configuring the reading and scanning device 3;

scanning a (front and/or back) image of a paper document fed to the reading and scanning device 3;

obtaining the results of said scan;

reading an optical and/or magnetic code through the reading and scanning device 3;

commanding a printing operation to be executed by a stamp or inkjet device;

specifying an e-mail address where to send the scan of the paper document.

In operation, the user device 5 sends a command to the reading and scanning device 3 with the syntax <command>, <URI>("Uniform Resource Identifier"), where <command> can have the values POST, GET and SET, whereas <URI> indicates the device involved in the request.

Assuming for example that the reading and scanning device 3 responds at the address http://18.31.0.34, then the request sent through the HTTP protocol will be of the type <http://18.31.0.34/file_name>, where "file_name" can take different values as will be specified below.

In order to configure the reading and scanning device 3, the user device 5 will use the request <POST http://18.31.0.34/config>. The request body will contain a plurality of parameters and the values thereof, as shown by way of example in the table of FIG. 3. Such parameters include power time-out (TIMEOUT), enabling the reading of the MICR code (EN_MICR) and type thereof (MICR-TYPE), enabling the scanning of the front image of the document (EN_FRONT_1) and format (FRONT_FORMAT_1) and resolution (FRONT_DPI_1) thereof, and similar parameters for the back side of the document (EN_REAR_1, REAR_FORMAT_1, REAR_DPI_1).

In order to operate the scanning means of the reading and scanning device 3, the user device 5 will use the request <POST http://18.31.0.34/scan>. When the scan is complete, the reading and scanning device 3 will transmit a reply to the POST message, thereby indicating that the scanning procedure has been carried out with no errors (code 302).

In order to obtain the scan result, the user device 5 will then use the request <GET http://18.31.0.34/result>.

Instead of scanning the front and back sides of the paper document, it is possible to scan either the front side or the back side only, for example by using the respective commands <GET http//18.31.0.34/front_image> and <GET http://18.31.0.34/rear_image>.

In order to obtain the result of the reading of an optical or magnetic code, the user device 5 will use the request <GET http://18.31.0.34/micr.txt>.

At each request, the reading and scanning device 3 will reply with a specific code of the HTTP protocol: 200 to indicate that the reading and scanning device 3 has correctly supplied the request content; 302 to indicate that the resource is available at another URI address; 404 to indicate that an error has occurred.

Instead of using the HTTP protocol, it is possible to implement the above-mentioned operations through a serial protocol.

The images obtained by scanning the paper document can be returned compressed in the known formats JPG and G4.

As aforesaid, the central processing unit 4 comprises a port 14 for a USB connector, which can be configured to operate as either a "device" or a "host".

When it is configured as a "device", the reading and scanning device 3 can be connected to the user device 5 through a standard USB cable. In this configuration, the reading and scanning device 3 operates in slave mode, since it is essentially driven by the user device 5, which will start and manage the transactions by using the HTTP protocol and the commands described above.

When it is configured as a "host", the reading and scanning device 3 can power and control an electronic key, or dongle, which is typically a WiFi dongle but may also be a Bluetooth or LAN one.

Of course, the "host" and "device" behaviours cannot coexist, but the reading and scanning device 3 can be designed to accept both a USB cable and a WiFi dongle, and mode switching can be done either manually by setting suitable parameters or automatically by "sensing" the presence of the 5V voltage generated by the USB. In fact, the operating system loaded in the card of the reading and scanning device 3 can automatically detect, during the boot stage, if the reading and scanning device 3 is being used as a "device" or a "host", detecting either the presence of a 5V supply at the internal USB port ("device" behaviour) or the absence of said supply ("host" behaviour). The switching between the two modes can be obtained by monitoring the presence of 5V voltage in real time and forcing an automatic reboot to set the system into the new mode.

The reading and scanning device 3 can be powered by a direct-current supply, or by 110-260 V mains alternating voltage through a suitable switching power supply. This type of supply can support both the "device" mode and the "host" mode.

As an alternative, the reading and scanning device 3 may be powered by a direct voltage source, e.g. like the one available in a motor vehicle, thus also ensuring mobile connectivity. In this case, the reading and scanning device 3 is powered through a direct-current power supply capable of accepting the DC input (12/24 V) from a motor vehicle and of adapting its own output to the voltage and current conditions required for powering the reading and scanning device 3.

As a further alternative, the reading and scanning device 3 may be equipped with lithium-ion-polymer (LiPo) batteries or the like to be able to operate in wireless mode in the "host" configuration, for example, but without limitation whatsoever, through a WiFi dongle. The connection of the reading and scanning device 3 to an external energy source (or to the DC-DC adapter) will supply power to the reading and scanning device 3 while at the same time recharging said batteries.

The possibility of operating the device in "host" mode or in "device" mode allows the user to use the reading and scanning device 3 in different scenarios, four of which will now be described by way of example.

Scenario 1

Figure 4:
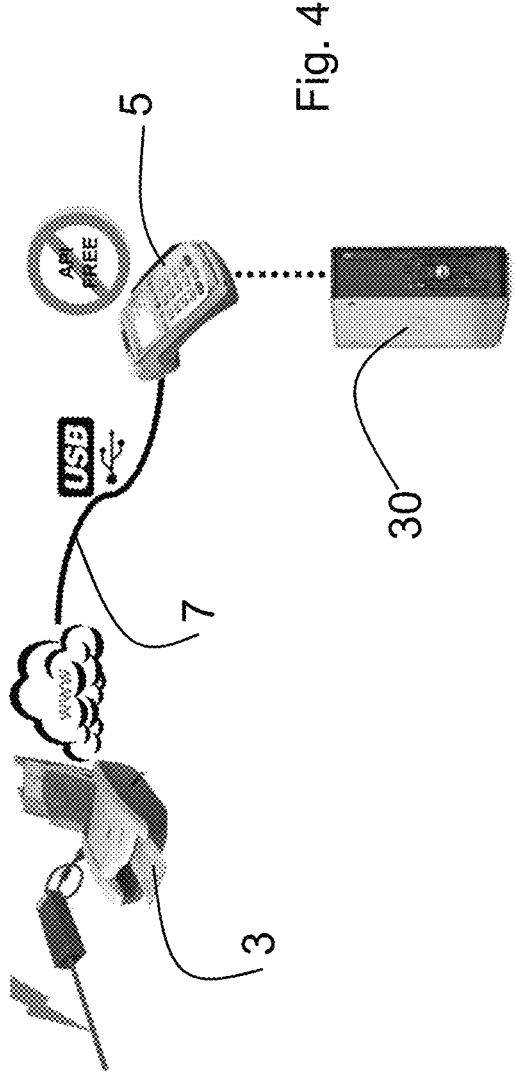
FIGS. 4-7 show some typical examples of applications of the system according to the present invention.

With reference to FIG. 4, there is shown a first scenario wherein the user device 5 consists of a POS terminal connected to the reading and scanning device 3 through a USB cable. The POS terminal is then connected to a remote server 30 of a bank, a post office or the like. The reading and scanning device 3 is powered by the electric mains. The paper document containing information adapted to generate a commercial transaction is read by the reading and scanning device 3, which stores into its temporary memory, managed by the digital signal processor 6, at least one image of the document (if it is a cheque, it will store both the front image and the back image), and possibly also other supplementary information read by the magnetic/optical reading means, e.g. the MICR code in the case of a cheque.

At least one image and any supplementary information are temporarily stored into the reading and scanning device 3 and are accessible from the POS terminal 5 via the HTTP protocol. Also the configuration of the reading and scanning device 3, containing parameters relating to the images to be captured, the light source, the resolution, the type of MICR codeline, the default mailbox, the codelines and the stamping, can be modified through the POS terminal via the HTTP protocol.

It can therefore be appreciated that no type of API ("Application Program Interface") or library needs to be installed into the POS terminal, so that any POS terminal can trigger a commercial transaction by starting from a paper document, just like a similar transaction would now be carried out through a credit card.

Some typical applications of the first scenario may include:
 making a payment through cheque with real-time cheque guarantee service;
 depositing a cheque remotely or at a point of purchase;
 paying invoices, bills, luncheon vouchers and the like.

Scenario 2

Figure 5:
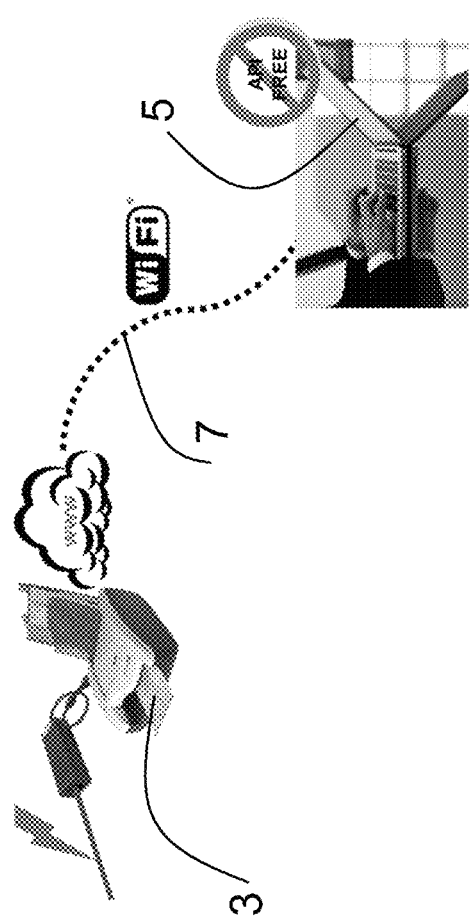

With reference to FIG. 5, there is shown a second scenario wherein the user device 5 consists of a computer connected to the reading and scanning device 3 through a WiFi connection. The reading and scanning device 3 is powered by the electric mains. The paper document containing information adapted to generate a commercial transaction is read by the reading and scanning device 3, which stores into its temporary memory, managed by the digital signal processor 6, at least one image of the document (if it is a cheque, it will store both the front image and the back image), and possibly also other supplementary information read by the magnetic/optical reading means, e.g. the MICR code in the case of a cheque.

At least one image and any supplementary information are temporarily stored into the reading and scanning device 3 and are accessible and possibly modifiable from the computer 5 via the HTTP protocol.

It can therefore be appreciated that no API ("Application Program Interface") needs to be installed in the computer, and therefore any computer equipped with a WiFi connection can trigger a commercial transaction by starting from a paper document supplied to the reading and scanning device 3.

Some typical applications of the second scenario may include:
- real-time acceptance of a cheque (reading and scanning device 3 in reception) and remote connection through a user device 5 from a professional firm at the end of the day for further treatment of the cheque data.

Scenario 3

Figure 6:
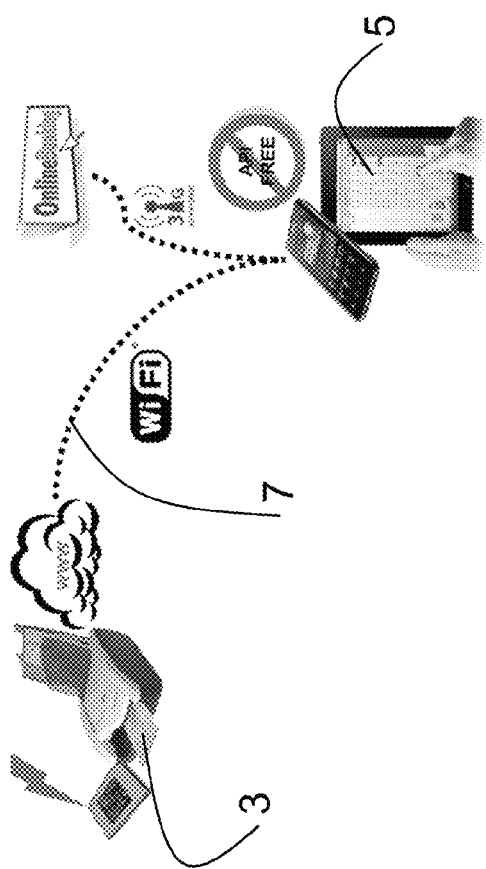

With reference to FIG. 6, there is shown a third scenario wherein the user device 5 consists of a smartphone, a tablet or a mobile telephone connected to the reading and scanning device 3 through a WiFi connection. This scenario is particularly suited to a situation of total mobility.

The reading and scanning device 3 is powered by rechargeable batteries or, through an adapter, by a direct current source, e.g. the 12V socket of a car. The paper document containing information adapted to generate a commercial transaction is read by the reading and scanning device 3, which stores into its temporary memory, managed by the digital signal processor 6, at least one image of the document (if it is a cheque, it will store both the front image and the back image), and possibly also other supplementary information read by the magnetic/optical reading means, e.g. the MICR code in the case of a cheque.

At least one image and any supplementary information are temporarily stored into the reading and scanning device 3 and are accessible from the tablet, smartphone or mobile telephone via the HTTP protocol. The tablet, smartphone or mobile telephone is then connected, through a data communication network other than the WiFi communication network, e.g. a 3G network, to an online banking site.

It can therefore be appreciated that no API ("Application Program Interface") needs to be installed in the tablet, smartphone or mobile telephone, and therefore any tablet, smartphone or mobile telephone equipped with a WiFi connection can trigger a commercial transaction by starting from a paper document supplied to the reading and scanning device 3.

Some typical applications of the third scenario may include:
- remote connection from a mobile device;
- multilevel marketing initiatives, e.g. Tupperware parties, wherein cheques are collected from different customers on an occasional basis.

Scenario 4

Figure 7:
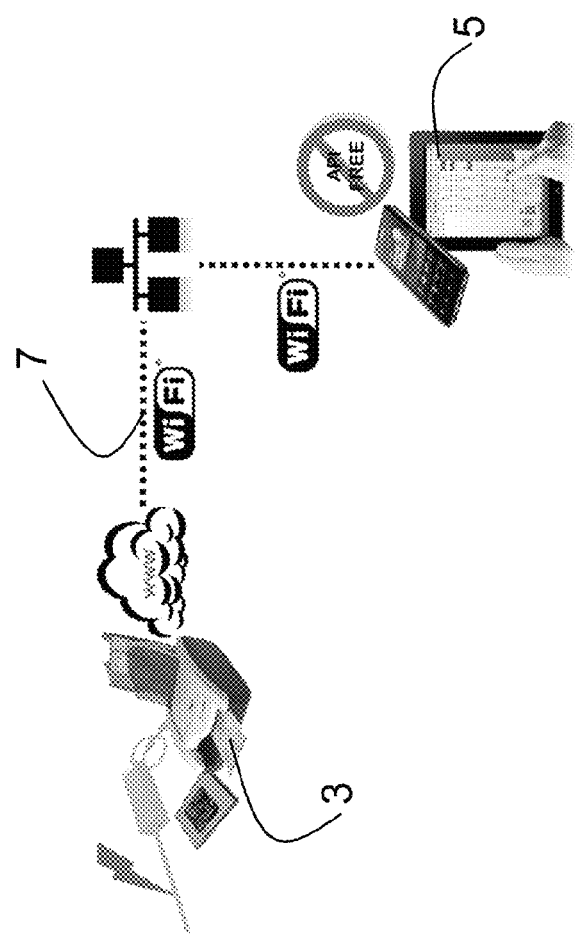

With reference to FIG. 7, there is shown a fourth scenario wherein the user device 5 consists of a smartphone, a tablet or a mobile telephone connected, through a WiFi connection, to a LAN ("Local Area Network"), and the same network is also made to include, by setting suitable masks and gateways, the reading and scanning device 3. The reading and scanning device 3 is powered by rechargeable batteries or, through an adapter, by a direct current source, e.g. the 12V socket of a car. The paper document containing information adapted to generate a commercial transaction is read by the reading and scanning device 3, which stores into its temporary memory, managed by the digital signal processor 6, at least one image of the document (if it is a cheque, it will store both the front image and the back image), and possibly also other supplementary information read by the magnetic/optical reading means, e.g. the MICR code in the case of a cheque.

At least one image and any supplementary information are temporarily stored into the reading and scanning device 3 and are accessible from the tablet, smartphone or mobile telephone via the HTTP protocol.

It can therefore be appreciated that no API ("Application Program Interface") needs to be installed in the tablet, smartphone or mobile telephone, and therefore any tablet, smartphone or mobile telephone equipped with a WiFi connection can trigger a commercial transaction by starting from a paper document supplied to the reading and scanning device 3.

Some typical applications of the fourth scenario may include:
- depositing cheques, paying invoices, digitalizing documents with high spatial flexibility, there being no wired connections because the reading and scanning device 3 is powered by a self-contained battery and the connection to the remaining system components is established in wireless mode.

The features of the present invention, as well as the advantages thereof, are apparent from the above description.

A first advantage of the device, system and method for making commercial transactions through a paper document according to the present invention is that any user device, in particular a POS terminal, a computer, a tablet, a smartphone, or a mobile telephone, can operate a reading device remotely because no specific application, in particular no API ("Application Program Interface"), is required.

A second advantage of the device, system and method according to the present invention is that it is possible to make a commercial transaction by using a paper document, in particular a cheque, a voucher, a luncheon voucher, an invoice and the like.

A further advantage of the device and method according to the present invention is that said commercial transaction can be made in mobility.

The device, system and method for making commercial transactions through a paper document described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a device, a system and a method for making commercial transactions through a paper document, but may be subject to many modifications, improvements or replacements of equivalent parts and elements without departing from the novelty spirit of the inventive idea, as clearly specified in the following claims.

The invention claimed is:

1. A system for making commercial transactions through a paper document, comprising:
    a device for reading and scanning said paper document containing information useful for a commercial transaction, said reading and scanning device having an IP (Internet Protocol) address and configured to make prints or endorsements on said paper document with a stamp or an inkjet printing system;
    a user device configured to conduct the commercial transaction using the information read and scanned from the paper document;
    an interface forming a connection between said reading and scanning device and said user device,
    wherein said reading and scanning device is configured to be used as a device (slave mode) or a host (master mode) and configured to be connected to the user device through different physical media including a USB cable, a WiFi dongle, a LAN cable or a serial protocol, said reading and scanning device comprising elements for reading an optical code or a magnetic code of a check, and a software interface adapted to exchange data and/or said information with said user device through said interface and via a HTTP/HTTPS protocol (Hyper Text Transfer Protocol/Hyper Text Transfer Protocol Secure), wherein the magnetic code includes a Magnetic Ink Character Recognition code, wherein the user device and the device for reading and scanning are connected and said data and/or information is exchanged between said device for reading and scanning and said user device without installing a software specific to the device for reading and scanning on the user device.

2. The system according to claim 1, wherein said device for reading and scanning said paper document implements an internal web server and said user device includes a browser or a specific application.

3. The system according to claim 1 wherein said reading and scanning device comprises a document and check sorter.

4. The system according to claim 1, wherein said interface operates in wired or wireless mode.

5. The system according to claim 1, wherein said user device comprises one of the following devices:
smartphone;
mobile telephone;
computer;
OS (Point of Sale) terminal;
tablet.

6. The system according to claim 1, wherein said reading and scanning device comprises a port for a USB (Universal Serial Bus) connector, which allows the reading and scanning device to operate in device mode or in host mode.

7. The system according to claim 6, wherein said reading and scanning device comprises power supply means adapted to power a dongle, of the WiFi, Bluetooth or Local Area Network type, when said reading device is powered as a host.

8. The system according to claim 6, wherein said reading and scanning device is able to automatically switch between the device and host modes.

9. The system according to claim 1, wherein said user device is adapted to transmit said data and/or said information through a communication network, or through a second connection other than said connection, to a computer of a bank, a post office or the like.

10. The system of claim 1, wherein said device for reading and scanning is configured to switch from the slave mode to the master mode or from the master mode to the slave mode.

11. The system of claim 1, wherein said device for reading and scanning is configured to operate in the slave mode and is configured to operate in the master mode, wherein the slave mode and the master mode are entered at different times.

12. A method for making commercial transactions through a paper document, the method comprising:
reading and scanning said paper document by a device for reading and scanning said paper document containing information useful for a commercial transaction, said reading and scanning device having an IP address,
making a print or an endorsement on said paper document with a stamp or an inkjet printing system; and
exchanging data and/or said information between said reading and scanning device and a user device through an interface via the HTTP/HTTPS protocol (HyperText Transfer Protocol/HyperText Transfer Protocol Secure), said reading and scanning device includes elements for reading an optical code or a magnetic code, the magnetic code including a Magnetic Ink Character Recognition code, wherein said reading and scanning device is configured to be used as a "device" (slave) or a "host" (master) and configured to be connected to the user device through different physical media including a USB cable, a WiFi dongle, a LAN cable or a serial protocol, wherein the user device is configured to conduct the commercial transaction using the information read and scanned from the paper document, and wherein the user device and the device for reading and scanning can be connected such that said data and/or information is exchanged between said device for reading and scanning and said user device without installing a software specific to the device for reading and scanning on the user device.

13. The method according to claim 12, wherein said device for reading and scanning said paper document implements an internal web server and said user device includes a browser or a specific application adapted to control said reading and scanning device in a manner such that the user device sees said reading and scanning device as a Web site.

14. The method according to claim 12, wherein said user device is able to command one or more of the following operations on said reading and scanning device:
configuring said reading and scanning device;
scanning a front and/or back image of said paper document to obtain a scan thereof;
obtaining the results of said scan;
reading an optical and/or magnetic code of said paper document;
commanding a printing operation to be executed by a stamp or inkjet device;
specifying an e-mail address where to send said scan.

15. A document and check sorter device, comprising:
a device for reading and scanning a paper document containing information useful for a commercial transaction, said reading and scanning device having an IP address and configured to make prints or endorsements on said paper document with a stamp or an inkjet printing system;
an interface for interfacing to a user device that is configured to conduct the commercial transaction using the information read and scanned from the paper document;
said reading and scanning device comprising elements for reading an optical code or a magnetic code, and a software interface adapted to exchange data and/or said information with said user device through said interface and via an HTTP/HTTPS protocol (HyperText Transfer Protocol/HyperText Transfer Protocol Secure), wherein the magnetic code includes a Magnetic Ink Character Recognition code, wherein said reading and scanning device is configured to be used as a "device" (slave) or a "host" (master) and configured to be connected to the user device through different physical media including a USB cable, a WiFi dongle, a LAN cable or a serial protocol, wherein the user device and the device for reading and scanning can be connected such that said data and/or information is exchanged between said device for reading and scanning and said user device without installing a software specific to the device for reading and scanning on the user device.

16. The device according to claim 15, wherein said interface is of a wireless type.

17. The device according to claim 15, wherein said interface comprises a port for a USB (Universal Serial Bus) connector.

18. The device according to claim 17, wherein said port for said USB connector can be configured in a device mode or in a host mode.

19. The device according to claim 18, wherein said device for reading and scanning is able to automatically switch between said device mode and said host mode.

20. The device according to claim 15, wherein said device for reading and scanning can be powered by a direct voltage source external to said device.

21. The device according to claim 15, wherein said device for reading and scanning is powered by batteries.

* * * * *